United States Patent
Böhmler

[19]

[11] Patent Number: 5,908,219
[45] Date of Patent: Jun. 1, 1999

[54] RESTRAINING SYSTEM FOR VEHICLE OCCUPANTS

[75] Inventor: Klaus Böhmler, Schwäbisch Gmünd, Germany

[73] Assignee: TRW Occupant Restraint Systems GmbH, Alfdorf, Germany

[21] Appl. No.: 08/863,696

[22] Filed: May 27, 1997

[30] Foreign Application Priority Data

Jun. 7, 1996 [DE] Germany .................. 296 10 078 U

[51] Int. Cl.$^6$ .................................................. B60N 2/42
[52] U.S. Cl. ........................................ 297/216.1; 297/468
[58] Field of Search .......................... 297/216.1, 216.16, 297/216.19, 284.11, 471, 472, 483, 468, 464, 284.1

[56] References Cited

U.S. PATENT DOCUMENTS

| | | |
|---|---|---|
| 2,401,748 | 6/1946 | Dillon . |
| 4,623,192 | 11/1986 | Koide et al. . |
| 4,738,485 | 4/1988 | Rumpf . |
| 5,340,185 | 8/1994 | Vollmer . |
| 5,567,006 | 10/1996 | McCarthy . |

FOREIGN PATENT DOCUMENTS

| | | |
|---|---|---|
| 2201659 | 4/1974 | France . |
| 2641244 | 7/1990 | France . |
| 3237167 | 4/1984 | Germany . |
| 1228657 | 4/1971 | United Kingdom . |
| 2265813 | 10/1993 | United Kingdom . |

OTHER PUBLICATIONS

Research Disclosure Nov., 31934, Seat Belt Activated Seat Ramp, p. 275.

*Primary Examiner*—Milton Nelson, Jr.
*Attorney, Agent, or Firm*—Tarolli, Sundheim, Covell, Tummino & Szato

[57] ABSTRACT

A restraining system for vehicle occupants, the vehicle occupant moving forwardly in case of a head-on impact and, subsequently, rebounds and moves backwardly, comprises a vehicle seat with a seat area and a squab, each of the seat area and the squab being slanted at an angle with respect to the horizontal plane. The restraining system further includes a restraining belt, a belt buckle anchored to the vehicle seat by which the restraining belt is coupled with the vehicle seat so that tension load exerted by the forward movement of the occupant to the restraining belt is transferred to the vehicle seat via the belt buckle in a restraining situation, and a setting device. The setting device is adapted to convert the tension load into a displacing movement of at least a portion of at least one of the seat area and the squab to amend its angle of slant.

24 Claims, 7 Drawing Sheets

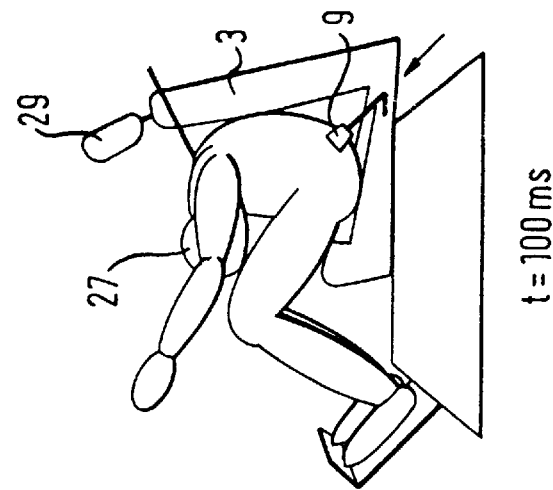
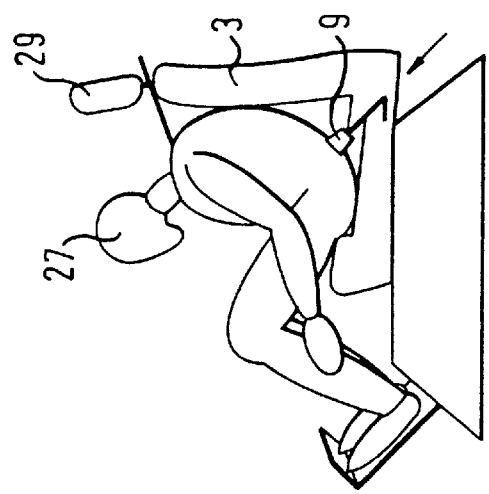
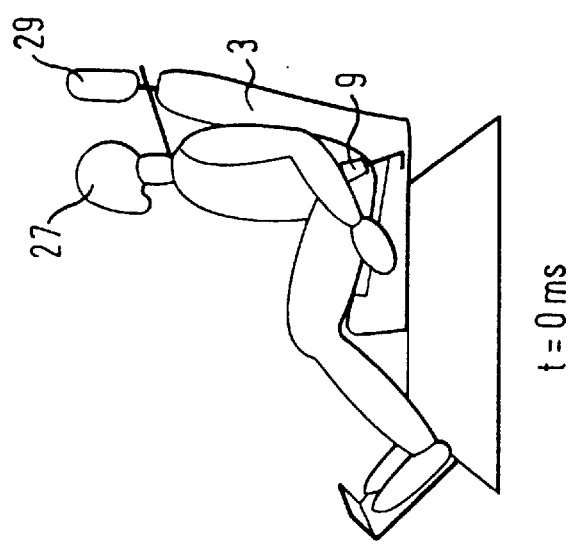

t = 140 ms t = 160 ms t = 220 ms

RESTRAINING SYSTEM FOR VEHICLE OCCUPANTS

FIELD OF THE INVENTION

The invention relates to a restraining system for vehicle occupants.

BACKGROUND OF THE INVENTION

In a head-on-collision, the torso and the head of an occupant are displaced forward until the forward movement is limited by the restraining belt. In the following rebound, the occupant's torso and head strike the squab and the headrest, respectively. In a conventional restraining system, the impact velocity is diminished because the squab is caused to follow up the forward motion of the occupant by a pyrotechnical drive with the result that the distances of the torso from the squab and also of the head from the headrest are reduced. Thereby, the risk of injury in the cervical vertebral region can be diminished. Furthermore, a restraining system is known which is adapted to increase the angle of inclination of the seat area, i.e. the surface of the cushion on which the occupant seats. In the case of short vehicle occupants there is in fact the danger that, in a vehicle impact, they may be so deeply thrust into the cushion of the vehicle seat owing to their low center of gravity in conjunction with a badly fitting restraining belt that the restraining belt slips onto the abdomen of the occupant where it may cause serious injuries. The danger of injury is even further increased, if the transfer of momentum is obliquely from the front, since then the pelvis of the occupant additionally rotates. By adjustment of the angle of slant of the seat area, the position of the occupant is stabilized so that he or she is now unable to be so deeply thrust into the cushion.

BRIEF DESCRIPTION OF THE INVENTION

The invention provides a simple and effective restraining system without any expensive energy sources for the operation of the restraining system. Furthermore, no complex measures are to be necessary to prevent accidental actuation of the restraining system. The restraining system according to the invention for occupants, which move forwardly in case of a head-on impact and, subsequently, rebounds and moves backwardly, comprises a vehicle seat with a seat area and a squab, each of the being slanted at an angle with respect to the horizontal plane. The restraining system further includes a restraining belt, a belt buckle anchored to the vehicle seat by means of which the restraining belt is coupled with the vehicle seat so that tension load exerted by the forward movement of the occupant to the restraining belt is transferred to the vehicle seat via the belt buckle in a restraining situation, and a setting means. The setting means is adapted to convert the tension load into a displacing movement of at least a portion of at least one of the seat area and the squab to amend its angle of slant.

The energy for displacing the one component of the vehicle seat, for example the squab or the cushion, is provided by the inertial mass of the vehicle occupant in the case of a collision, since the displacing means converts the force transferred by the occupant via the restraining belt to the belt buckle into a displacing movement. Accidental actuation of the restraining system is out of the question, since the system is directly coupled with the movement of the vehicle occupant.

In a preferred embodiment on the basis of a first principle of the restraining system of the invention, the squab of the vehicle seat is coupled with the setting means, and in the case of a head-on vehicle impact, the squab is pivoted forward and thus caused to follow the forward motion of the passenger. In this case, the squab is preferably so designed that during the following rebound of the occupant it is pivoted by the backward movement of the occupant such that the occupant does not strike any relatively hard structure.

In accordance with a further embodiment, the setting means is so designed that the range of pivoting of the squab may be changed dependent on the intensity of the impact.

The provision of a damping element which is coupled with the squab damps the pivotal movement of the squab to the rear. The shifting movement of the occupant to the rear is consequently slowly delayed.

One simple design of the restraining system of the invention is such that the setting means is connected with the slant adjustment mechanism for the squab, for which reason the parts otherwise necessary in addition for the setting means are no longer required.

In the case of a preferred embodiment according to a second principle of the restraining system in accordance with the invention, there is a provision such that the setting means increases the angle of slant of the cushion in the case of a restraining situation. In this case, the setting means may be coupled with the seat area slant adjustment mechanism able to be operated by the vehicle occupant or may be coupled with the same during restraining action.

There are various possibilities as regards the way in which the angle of slant of the cushion surface is increased. The setting means may, for instance, be so designed that it increases the angle of slant of the entire cushion of the vehicle seat or so that only an element within the front part of the cushion which is designed for sliding or pivoting movement lifts the front part of the cushion on operation of the setting means. Furthermore, a seat shell which is pivotally arranged within the cushion can be so connected with the setting means that pivoting of the seat shell leads to an increase in the angle of the angle of the slant of the seat area adjoining the seat shell.

Furthermore, it is an advantage, if the restraining system comprises a force limiter which is coupled with the setting means on the belt buckle side thereof.

BRIEF DESCRIPTION OF THE DRAWINGS

FIGS. 4a through 4f show six sequentially occurring phases in a head-on crash illustrating the movements of a vehicle occupant and the associated shifting of the squab.

DETAILED DESCRIPTION OF PREFERRED EMBODIMENTS

Figure 1:
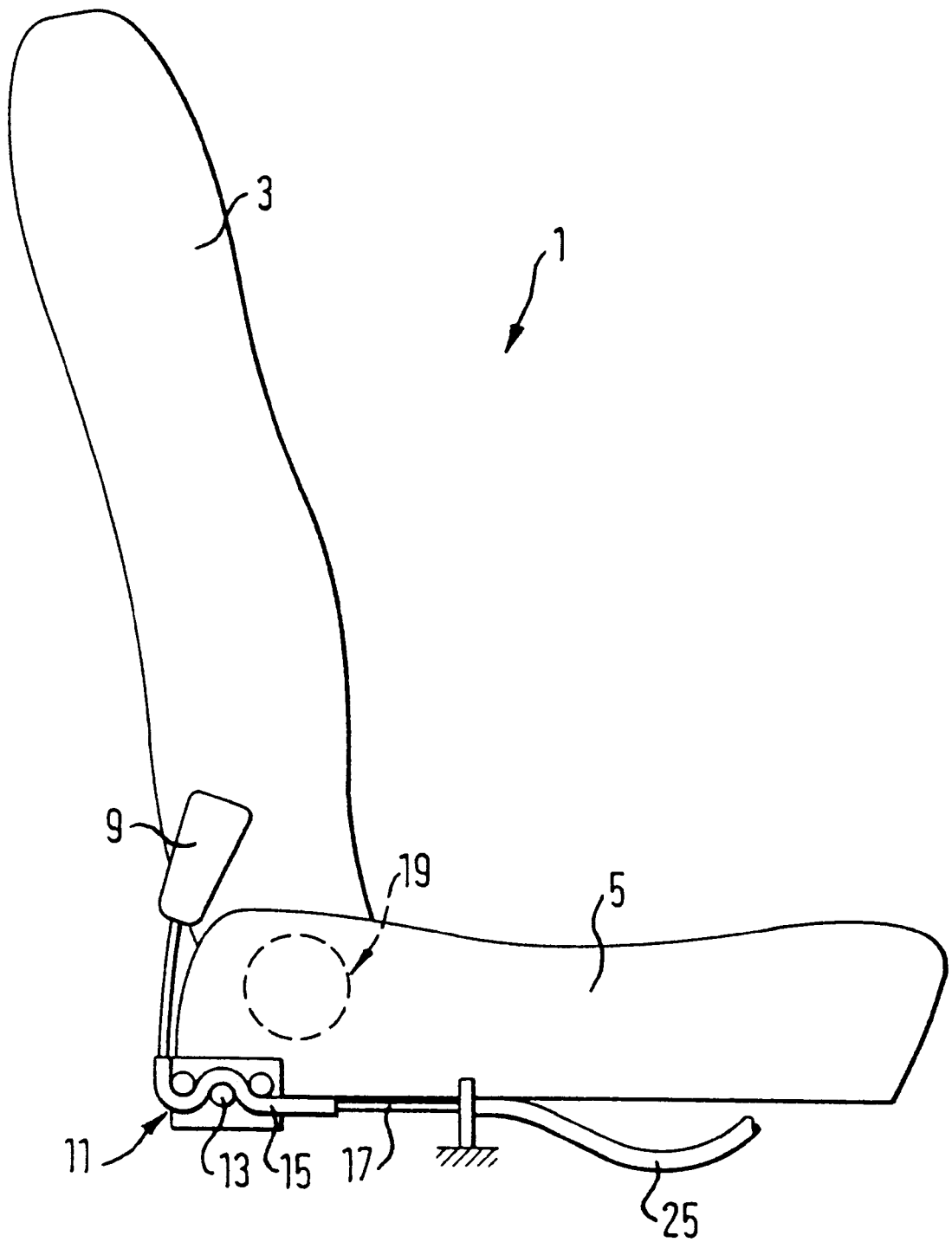
FIG. 1 shows one embodiment of the restraining system of the invention, in the case of which the squab of a vehicle seat is pivoted for a rear holding action.

In the drawings two different principles for the design of restraining systems for a vehicle occupant are illustrated, which respectively comprise a vehicle seat 1 with a squab or back rest 3 and a cushion 5 or generally horizontal seat part. In the case of the first principle of the restraining system illustrated in FIGS. 1 through 4 in a crash the squab 3 can be pivoted, whereas in the second design principle depicted in FIGS. 5 through 7 the angle of slant of the seat area of the cushion may be varied.

Figure 5:
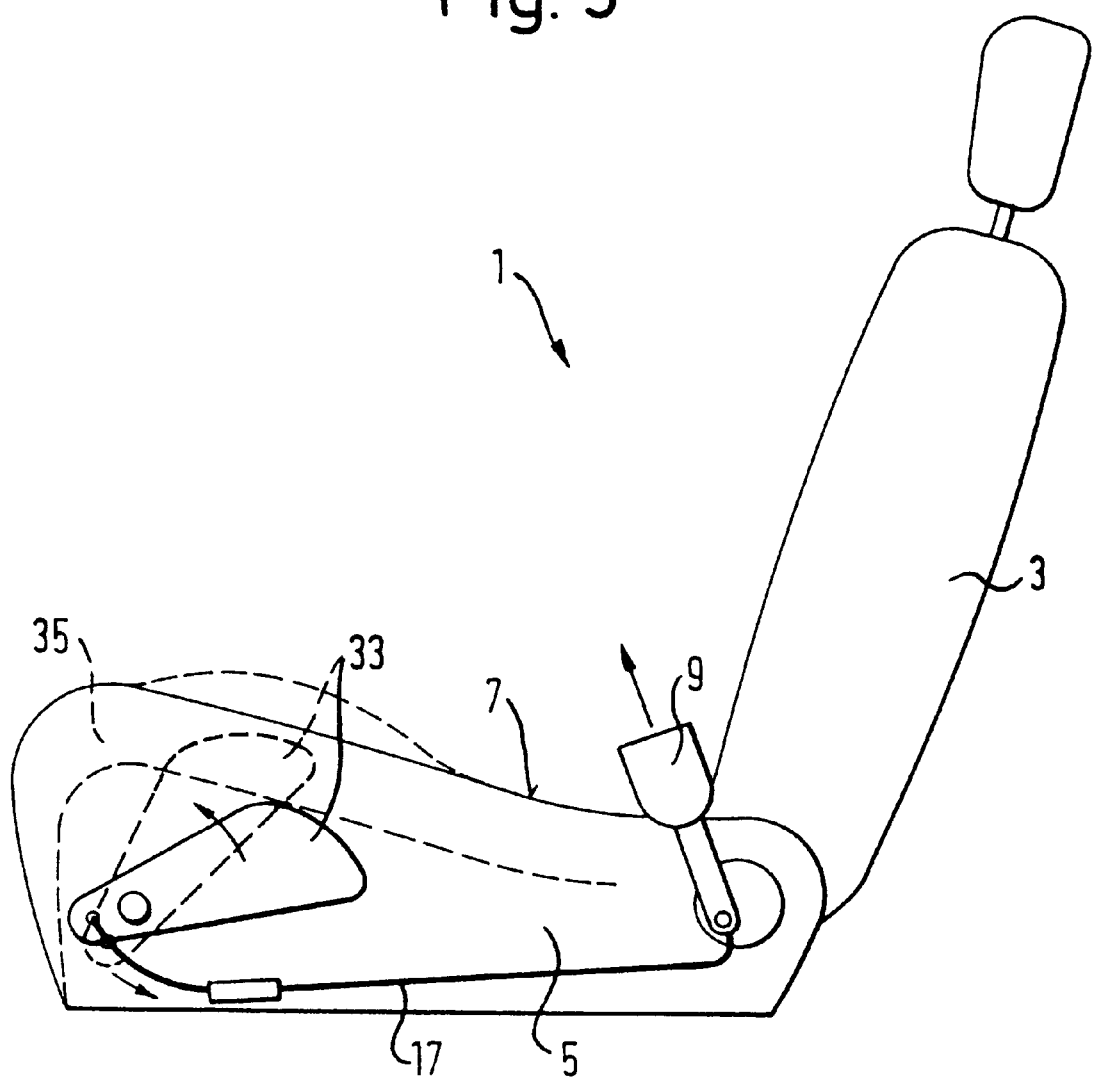
FIG. 5 shows a first embodiment of the restraining system of the present invention having an adjustable cushion, such adjustment or setting being performed by a setting means in the form of a pivotally mounted element.
Figure 6:
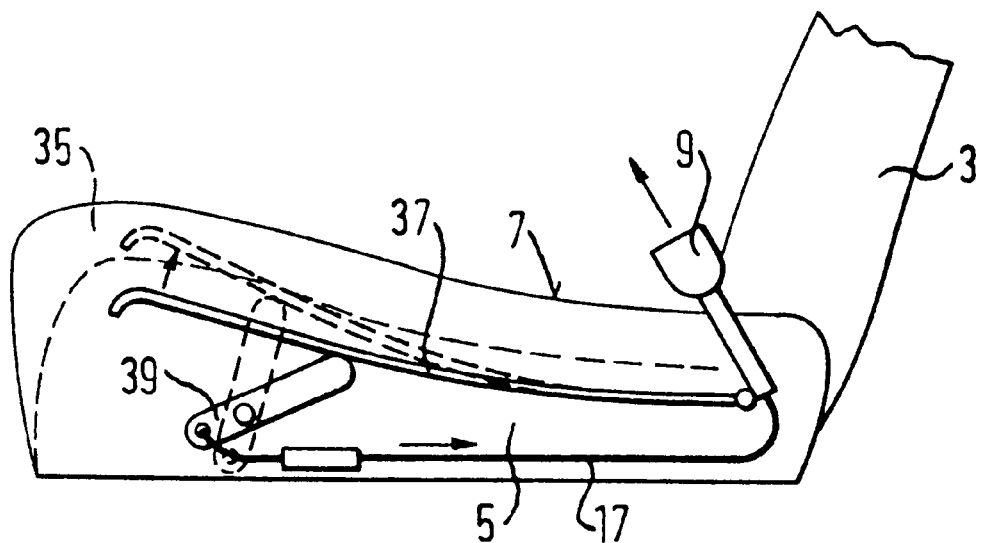
FIG. 6 shows a second embodiment of the restraining system in accordance with the invention with an adjustable cushion, adjustment being performed by a pivotal seat shell.
Figure 7:
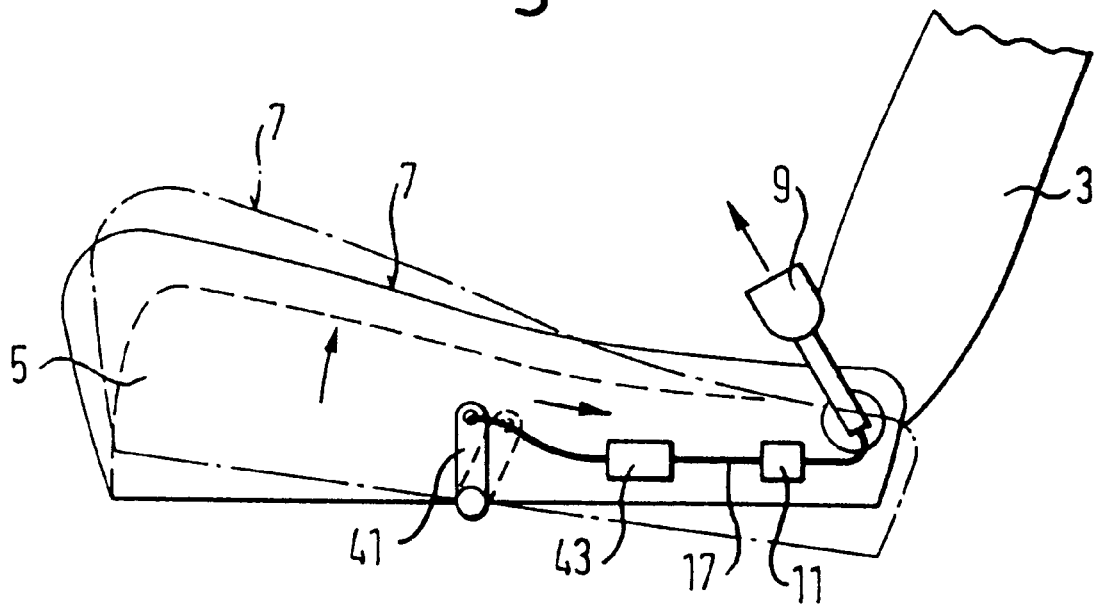
FIG. 7 shows a third embodiment of the restraining system in accordance with the invention with an adjustable cushion, adjustment being performed by operation of the seat slant adjustment mechanism.

Although in the embodiments of the restraining system illustrated in FIGS. 1 through 4 and respectively in FIGS. 5 through 7 are shown separately, there is the possibility of incorporating both designs in a single vehicle seat 1, same then having an adjustable squab 3 and an adjustable seat area 7.

In the figures, parts having the same function are denoted by like reference numerals.

In FIG. 1 the vehicle seat 1 possesses a belt buckle 9 anchored thereon and connected with a force limiter 11. The force limiter 11 comprises a plurality of cable bend or guide pulleys 13 and a plastically deformable casing 15 of a cable 17, attached to the belt buckle 9, between the bend pulleys 13.

Figure 2:
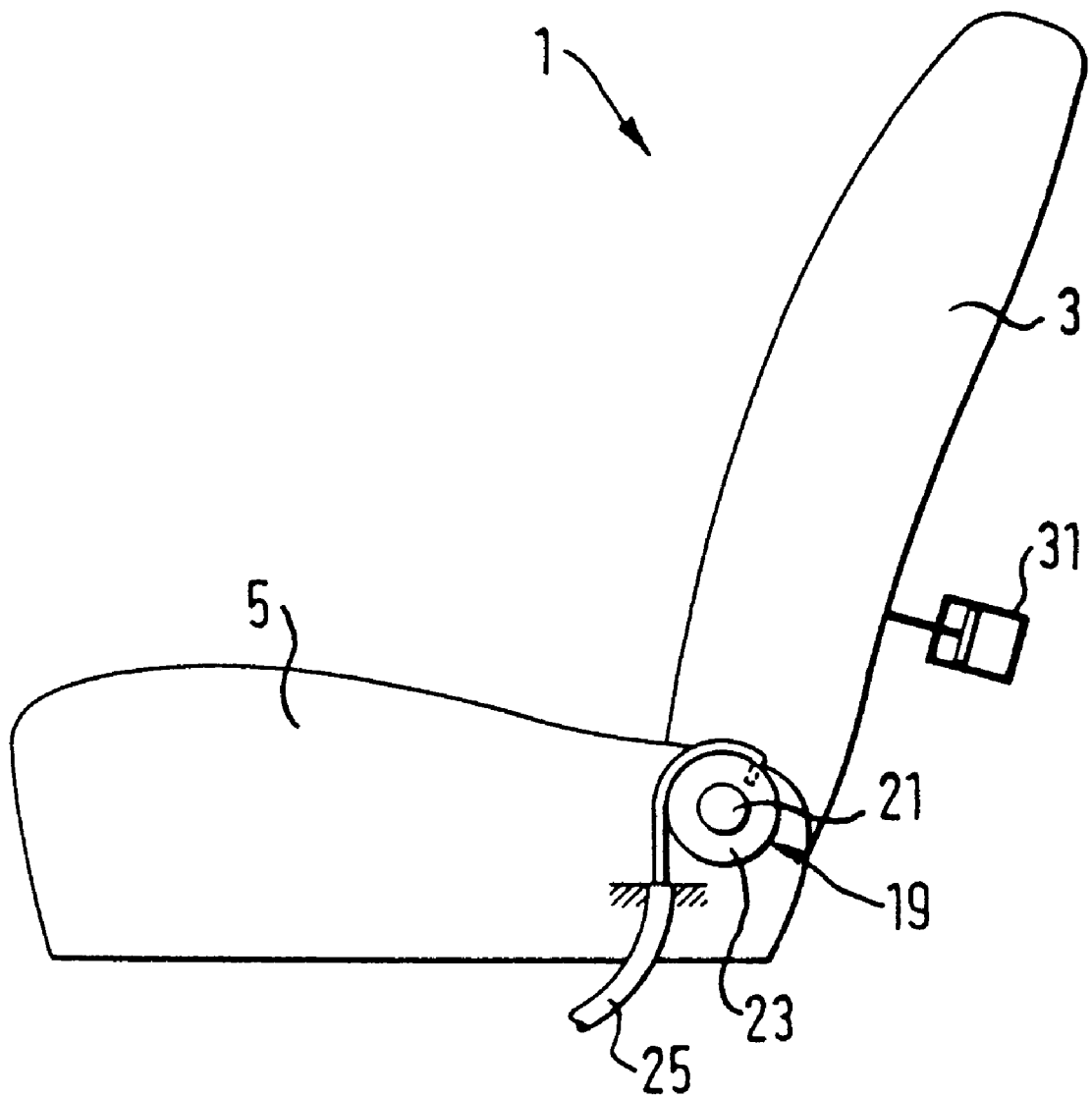
FIG. 2 is a view of the opposite side of the vehicle seat illustrated in FIG. 1.

The cable 17 extends from the force limiter 11 underneath the cushion 5 forward and is prolonged by a core 18, attached to it, of a bowden cable 25 (see FIG. 3), which is redirected back to the rear, where it is attached to a diagrammatically illustrated slant adjustment mechanism 19 for the squab 3, as is illustrated in FIG. 2. The attachment of the cable 18 on the slant adjustment mechanism 19 is by means of a locking clutch, not illustrated, between a shaft 21 as part of the slant adjustment mechanism 19 and a pulley, on which the cable 18 is attached. The clutch is here so designed that it only couples the shaft 21 and the pulley 23 drivingly after actuation of the restraining system. A further clutch, not illustrated, connects the shaft 21 with the drive in the form of a hand wheel for the slant adjustment mechanism 19. On actuation of the restraining system this clutch separates the drive from the slant adjustment mechanism 19 in order to prevent trouble conditions due to movements caused by actuation.

The traction cable 17, connected with the belt buckle 9, together with its extension constitutes a setting means for producing a setting movement for the squab 3 when a restraining action is to be performed. In a head-on crash the setting means, which serves to pivot the squab 3 about its pivot axis, namely the center line of the shaft 21, as will be explained in more detail in the following, receives the energy necessary for pivoting the squab 3 owing to the tension load, transferred by the belt buckle 9, owing to the forward displacement of the vehicle occupant in such crash.

Figure 3:
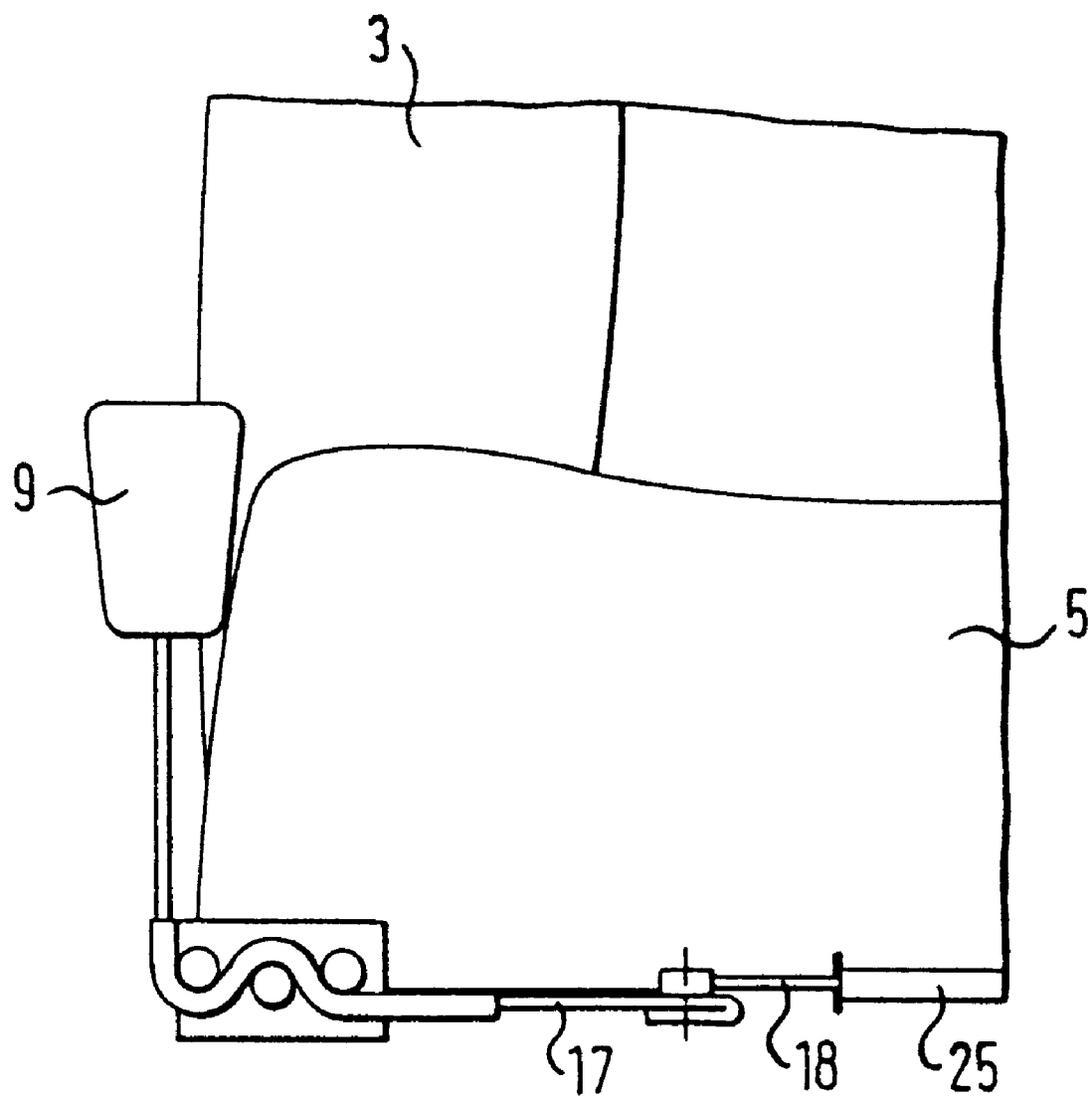
FIG. 3 is a view on a larger scale of the restraining system depicted in FIG. 1.
Figure 4D:
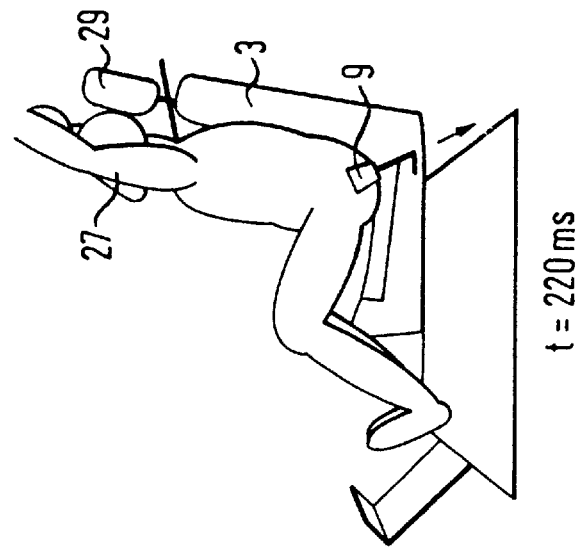
Figure 4E:
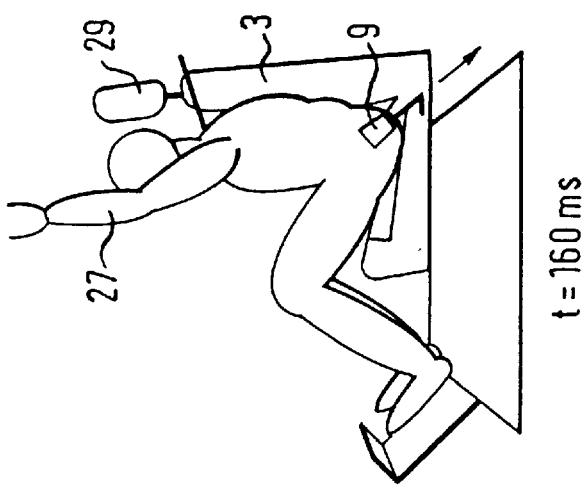
Figure 4F:
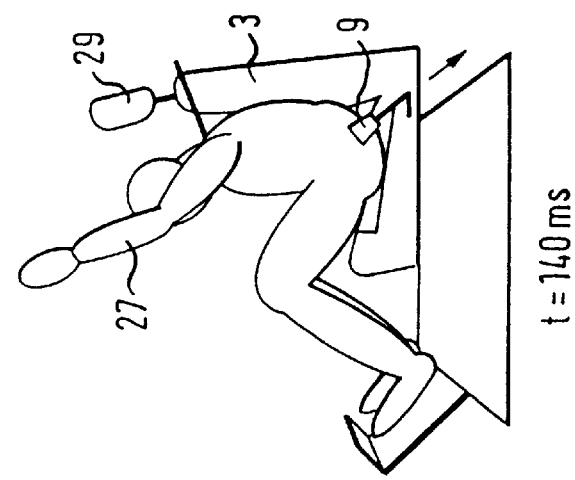

The manner of functioning of the restraining system illustrated in FIGS. 1 through 3 will now be explained with reference to FIGS. 4a through 4f.

When the restraining system is not actuated it is possible, using the hand wheel drive of the slant adjustment mechanism 19 to move the squab 3 so that the inclination of the squab 3 is adapted to the height of the vehicle occupant 27 in the best possible manner. In this condition the setting mechanism is not coupled with the slant adjustment mechanism 19.

At the point in time in which t=0 ms, i. e. at the start of a head-on vehicle crash, the upper body of the occupant 27 will be in contact with the squab 3 and his head will be at a certain distance from a headrest 29 mounted on the squab 3.

After 60 ms more particularly the occupant's upper body and head will have moved so far forward that via the restraining belt a tension force will be transmitted to the belt buckle 9 and accordingly to the traction cable 17 and the cable 18, such force leading to a displacement of the traction cable 17 and of the cable 18 in the direction of the arrow in FIG. 4b. Owing to this movement, the casing 15, manufactured of aluminum, is moved between the offset cable bend pulleys 13, thus leading to a plastic deformation of the casing 15 and accordingly to energy dissipation. Owing to the displacement of the cable 17 and of the cable 18, the clutch provided between the pulley 23 and the shaft 21 is engaged and connects such parts with one another so that the squab 3 is pivoted forward owing to the displacement of the belt buckle 9 to the front, as shown in FIG. 4b. The squab 3 is consequently automatically caused to keep up with the forward displacement of the vehicle occupant. The follow-up motion of the squab 3 is dependent on the violence of the vehicle crash and the range of pivoting of the squab 3 increases with the violence of the vehicle crash.

A further forward shift of the vehicle occupant 27, up until a point in time of about t=100 ms after the start of the crash, will lead to a steady follow-up movement of the squab 3. In the condition illustrated in FIG. 4c the vehicle occupant 27 has generally reached his foremost position, in which the restraining belt does not permit any further forward displacement.

Following this there is a backward displacement of the vehicle occupant 27. Since however, despite the forward displacement, his back is still in engagement with the squab 3 and the distance between his head and the headrest 29, which performs a follow-up movement, is small, his head will have a relatively low velocity on engaging the headrest 29. In the case of a head-on crash with a slight lateral component there has, furthermore, so far been the danger that when the vehicle occupant 27 rebounds his head may miss the headrest 29. In the case of a squab 3 together with a headrest performing a follow-up movement this risk will be substantially less.

The slant adjustment mechanism 19 for the squab 3 is connected by the traction cable 17 and the cable 18 not only in the pivot direction forward but also in the pivot direction to the rear drivingly with the belt buckle 9 and the force limiter 11. The squab 3 is not locked in the foremost position so that in a crash it is pivoted to the rear owing to the backward displacement of the vehicle occupant 27 (see FIGS. 4d through 4f). Consequently, reversely to the movement indicated in FIGS. 4a through 4c, this leads to a displacement of the belt buckle 9 in the direction of the arrow indicated in FIGS. 4d through 4f. This in turn leads to renewed actuation of the force limiter 11, which then during pivoting of the squab 3 to the rear dissipates energy and hence acts as a damping element. An additional damping element 31, as is shown in FIG. 2, reinforces the damping effect still further so that during rebound the vehicle occupant 27 is not slung against a rigid squab 3 together with the headrest 29, but is relatively gently retarded by the squab 3 together with the headrest 29, which are on the move to the rear.

The forward displacement of the squab 3 provides enhanced protection not only for the front vehicle occupant but also for rear passengers who cannot be thrown against the squab 3 so that the danger of head injuries to such passengers is reduced.

In the case of the restraining system illustrated in FIGS. 5 through 7, the force for setting a component of the vehicle seat 1, namely the seat area 7, is brought about by displacement of the belt buckle 9, too, owing to the tension load acting on the restraining belt. The traction cable 17 extends from the belt buckle 9 forward to a pivotally mounted element 33 in the form of a two-armed lever, which extends practically over the entire width of the seat. The traction cable 17 and the element 33 constitute a setting means. In the non-actuated state of the restraining system, one arm of the lever rests against the lower side of an upholstery 35. The traction cable 17 is affixed to the opposite arm of the lever. When tension acts on the belt buckle 9 in the direction of the arrow indicated in FIG. 1, the element 33 is turned in the counter-clockwise direction owing to displacement of the traction cable 17 with the result that one arm thrusts the front region of the seat area 7 together with the upholstered part 35 upward as shown in FIG. 5 by broken lines.

In the embodiment depicted in FIG. 6, a seat shell 37, constituting a part of the setting means, is pivotally mounted in the interior of cushion 5. In the front part of the seat shell 37, one arm of a two-armed lever 39 engages its lower side, the opposite arm of such lever being connected with the traction cable 17. On displacement of the belt buckle 9 in the direction of the arrow the lever 39 is pivoted in the counter-clockwise direction and moved into an approximately vertical position so that it pivots the seat shell 37 in the clockwise direction and the angle of slant of the seat area 7 to the horizontal is increased.

In the embodiment of the restraining system illustrated in FIG. 7, the traction cable 17 is coupled with a seat area slant adjustment mechanism 41. A clutch 43 arranged between sections of the cable 17 ensures that the seat area slant adjustment mechanism 41 is only drivingly connected with the belt buckle 9 when there is a collision. The force limiter 11 coupled with the cable 17 serves to provide a damping action on forward displacement of the vehicle occupant when a restraining effect is being provided. The force limiter 11 is only actuated as from a certain intensity of the vehicle's impact. This means that in the case of the embodiment as shown in FIG. 7 a displacement of the cable 17 will only take place as from a certain predetermined intensity of impact.

In the embodiment of the restraining system depicted in FIGS. 5 through 7, the angle of slant of the seat area 7 is changed by a purely mechanical setting means without any additional source of energy being required. Instead of a pivoting lever mechanism it is possible to provide a linear guide, by which for example a wedge in the front region of the cushion 5 is moved obliquely upward in order to move the seat area 7 upward in this region.

In the following, the manner of operation of the restraining system of FIGS. 5 to 7 will be described in a head-on crash on the basis of FIG. 7. In a head-on crash the vehicle occupant is moved forward in relation to the vehicle seat 1 and accordingly produces a heavy tension load which is transmitted to the belt buckle 9 so that same is displaced in the direction of the arrow. The force limiter 11 permits a displacement of the belt buckle 9 accompanied by a plastic deformation of the casing 15 of the cable 17 with the result that the restraining force exerted by the restraining belt on the vehicle occupant is limited. Owing to the rapid displacement of the belt buckle 9 and of the cable 17 connected therewith the clutch 43 is engaged so that a driving connection is produced between the belt buckle 9 and the seat slant adjustment mechanism 41. The cushion 5 as a whole is accordingly pivoted in the clockwise direction so that the angle of slant of the seat area 7 is increased, as is indicated by chained lines in FIG. 7. The degree of re-setting of the seat area 7 will depend on the intensity of the vehicle crash, since in the case of a high intensity the vehicle occupant will be thrown forward further. The slanting seat area 7 inclined more steeply to the rear will steady the position of the vehicle occupant in a head-on crash so that the risk, applying more particularly for small vehicle occupants, of the restraining belt's slipping onto the abdomen if there is an excessive displacement of the pelvis, is reduced.

The functions performed in the embodiments of the restraining system illustrated in FIGS. 5 and 6 are generally the same as the events described on the basis of FIG. 7, the displacement of the belt buckle 9 in the embodiment of FIG. 5 meaning that the element 33 is pivoted in the anti-clockwise direction so that only the front part of the seat area 7 is lifted, whereas the pivoting of the lever 39 in accordance with FIG. 6 means that the entire seat shell 37 and accordingly the entire seat area 7 is re-set.

A combination of the embodiments of the restraining system depicted in FIGS. 1 through 4 and furthermore of FIGS. 5 through 7, may be such for instance that the cable 17 is branched off to the belt buckle 9. A part of the cable 17, that is to say a first setting means, ensures the setting of the seat area 7 and a second part of the cable 17, i. e. a second setting means, provides for setting of the squab 3.

I claim:

1. A restraining system for vehicle occupants, said vehicle occupant moving forwardly in case of a head-on impact and, subsequently, rebounds and moves backwardly, said system comprising a vehicle seat with a seat area and a squab, said seat area and said squab being slanted at an angle with respect to the horizontal plane, a restraining belt, a belt buckle anchored to said vehicle seat by means of which said restraining belt is coupled with said vehicle seat so that tension load exerted by said forward movement of said occupant to said restraining belt is transferred to said vehicle seat via said belt buckle in a restraining situation, and a setting means which is adapted to convert said tension load into a displacing movement of at least a portion of at least one of said seat area and said squab to amend its angle of slant, wherein said squab is connected with said setting means by which, in the case of a head-on impact, the squab is pivoted forwardly and is so caused to follow the forward movement of the vehicle occupant and wherein a slant adjustment mechanism for said squab is provided to adjust the slant of said squab relative to said seat area, said setting means being connected to said slant adjustment mechanism.

2. The restraining system as claimed in claim 1, wherein said squab is so designed that it is pivoted backwardly owing to said backward displacement of said occupant in said subsequent rebound of said occupant.

3. The restraining system as claimed in claim 1, wherein a force limiter connected with said belt buckle is provided, such force limiter being coupled with the setting means.

4. The restraining system as claimed in claim 1, wherein said restraining system is adapted to be activated on a vehicle impact having a predetermined intensity.

5. The restraining system as claimed in claim 1, wherein said setting means is so designed that the range of pivoting of said squab may be changed in a manner dependent on the intensity of the impact.

6. The restraining system as claimed in claim 5, wherein a damping element is provided to which said squab is connected, said dampening element being adapted to damp a backward pivotal movement of said squab.

7. The restraining system as claimed in claim 1, wherein said setting means is so designed that it is only coupled with said slant adjustment mechanism for said squab on actuation of said restraining system.

8. The restraining system as claimed in claim 7, wherein a drive for said slant adjustment mechanism is provided and wherein said setting means is so designed that said drive is uncoupled from said slant adjustment mechanism on actuation of said restraining system so that only said setting means is coupled with said slant adjustment mechanism.

9. A restraining system for vehicle occupants, said vehicle occupant moving forwardly in case of a head-on impact and, subsequently, rebounds and moves backwardly, said system comprising a vehicle seat with a seat area and a squab, said seat area and said squab being slanted at an angle with respect to the horizontal plane, a restraining belt, a belt buckle anchored to said vehicle seat by means of which said restraining belt is coupled with said vehicle seat so that tension load exerted by said forward movement of said occupant to said restraining belt is transferred to said vehicle seat via said belt buckle in a restraining situation, and a setting means which is adapted to convert said tension load into a displacing movement of at least a portion of at least one of said seat area and said squab to amend its angle of slant, wherein said setting means is adapted to increase the angle of slant of said seat area during restraining action, and wherein an occupant-operable seat area slant adjustment mechanism is provided to adjust the angle of the seat area with respect to the squab, said setting means being coupled with said seat area slant adjustment mechanism.

10. The restraining system as claimed in claim 9, wherein said setting means is coupled with said seat area slant adjustment mechanism during restraining action.

11. The restraining system as claimed in claim 9, wherein said seat has a cushion with an upper surface which defines said seat area, said setting means is designed for increasing the angle of slant of said entire cushion.

12. The restraining system as claimed in claim 9, wherein said seat has a cushion with an upper surface which defines said seat area and wherein said setting means comprises an element pivotally mounted in the front part of said cushion and adapted to lift said front part on operation of said setting means.

13. The restraining system as claimed in claim 9, wherein said seat has a cushion with an upper surface which defines said seat area and wherein said setting means comprises an element slidingly mounted in the front part of said cushion and adapted to lift said front part on operation of said setting means.

14. The restraining system as claimed in claim 9, wherein said increase of said angle of slant of said seat area as caused by said setting means is dependent on the intensity of the vehicle impact.

15. The restraining system as claimed in claim 9, wherein a second setting means for re-setting the angle of slant of the seat area is provided.

16. The restraining system as claimed in claim 9, wherein a force limiter connected with said belt buckle is provided, such force limiter being coupled with the setting means.

17. The restraining system as claimed in claim 9, wherein said restraining system is adapted to be activated on a vehicle impact having a predetermined intensity.

18. The restraining system as claimed in claim 9, wherein said seat has a cushion with an upper surface which defines said seat area and wherein said setting means comprises a seat shell arranged pivotally within said cushion and wherein pivoting of said seat shell leads to an increase in the angle of slant of said seat area adjoining said seat shell.

19. The restraining system as claimed in claim 18, wherein said setting means includes a two-armed lever and wherein a traction cable is provided, one arm of said lever engaging said seat shell and the other arm thereof being connected with said traction cable.

20. A restraining system for vehicle occupants, said vehicle occupant moving forwardly in case of a head-on impact and, subsequently, rebounds and moves backwardly, said system comprising a vehicle seat with a seat area and a squab, said seat area and said squab being slanted at an angle with respect to the horizontal plane, a restraining belt, a belt buckle anchored to said vehicle seat by means of which said restraining belt is coupled with said vehicle seat so that tension load exerted by said forward movement of said occupant to said restraining belt is transferred to said vehicle seat via said belt buckle in a restraining situation, and a setting means which is adapted to convert said tension load into a displacing movement of at least a portion of at least one of said seat area and said squab to amend its angle of slant, wherein said squab is connected with said setting means by which, in the case of a head-on impact, the squab is pivoted forwardly and is so caused to follow the forward movement of the vehicle occupant, wherein a slant adjustment mechanism for said squab is provided, said setting means being connected to said slant adjustment mechanism, and wherein said setting means is so designed that it is only coupled with said slant adjustment mechanism of said squab on actuation of said restraining system.

21. The restraining system as claimed in claim 20, wherein a drive for said slant adjustment mechanism is provided and wherein said setting means is so designed that said drive is uncoupled from said slant adjustment mechanism on actuation of said restraining system so that only said setting means is coupled with said slant adjustment mechanism.

22. A restraining system for vehicle occupants, said vehicle occupant moving forwardly in case of a head-on impact and, subsequently, rebounds and moves backwardly, said system comprising a vehicle seat with a seat area and a squab, said seat area and said squab being slanted at an angle with respect to the horizontal plane, a restraining belt, a belt buckle anchored to said vehicle seat by means of which said restraining belt is coupled with said vehicle seat so that tension load exerted by said forward movement of said occupant to said restraining belt is transferred to said vehicle seat via said belt buckle in a restraining situation, and a setting means which is adapted to convert said tension load into a displacing movement of at least a portion of at least one of said seat area and said squab to amend its angle of slant, wherein said setting means is adapted to increase the angle of slant of said seat area during restraining action and wherein said seat has a cushion with an upper surface which defines said seat area and wherein said setting means comprises an element slidingly mounted in the front part of said cushion and adapted to lift said front part on operation of said setting means.

23. A restraining system for vehicle occupants, said vehicle occupant moving forwardly in case of a head-on impact and, subsequently, rebounds and moves backwardly, said system comprising a vehicle seat with a seat area and a squab, said seat area and said squab being slanted at an angle with respect to the horizontal plane, a restraining belt, a belt buckle anchored to said vehicle seat by means of which said restraining belt is coupled with said vehicle seat so that tension load exerted by said forward movement of said occupant to said restraining belt is transferred to said vehicle seat via said belt buckle in a restraining situation, and a setting means which is adapted to convert said tension load into a displacing movement of at least a portion of at least one of said seat area and said squab to amend its angle of slant, wherein said setting means is adapted to increase the angle of slant of said seat area during restraining action and wherein said seat has a cushion with an upper surface which defines said seat area and wherein said setting means comprises a seat shell arranged pivotally within said cushion and wherein pivoting of said seat shell leads to an increase in the angle of slant of said seat area adjoining said seat shell.

24. The restraining system as claimed in claim 23, wherein said setting means includes a two-armed lever and wherein a traction cable is provided, one arm of said lever engaging said seat shell and the other arm thereof being connected with said traction cable.

* * * * *